US011215097B2

(12) United States Patent
Schmidt

(10) Patent No.: US 11,215,097 B2
(45) Date of Patent: Jan. 4, 2022

(54) AUTOMATED DIESEL EXHAUST FLUID (DEF) SYSTEM AND METHOD

(71) Applicant: Chemoil Corporation, Oklahoma City, OK (US)

(72) Inventor: Brennan Schmidt, Weatherford, OK (US)

(73) Assignee: Chemoil Energy Services LLC, Oklahoma City, OK (US)

(*) Notice: Subject to any disclaimer, the term of this patent is extended or adjusted under 35 U.S.C. 154(b) by 0 days.

(21) Appl. No.: 16/933,671

(22) Filed: Jul. 20, 2020

(65) Prior Publication Data
US 2021/0017890 A1 Jan. 21, 2021

Related U.S. Application Data

(60) Provisional application No. 62/876,307, filed on Jul. 19, 2019.

(51) Int. Cl.
*F01N 3/20* (2006.01)
*F01N 3/28* (2006.01)

(52) U.S. Cl.
CPC ......... *F01N 3/2066* (2013.01); *F01N 3/2896* (2013.01); *F01N 2390/02* (2013.01); *F01N 2550/05* (2013.01); *F01N 2610/02* (2013.01); *F01N 2610/142* (2013.01); *F01N 2610/148* (2013.01); *F01N 2610/1413* (2013.01); *F01N 2610/1433* (2013.01); *F01N 2900/1814* (2013.01)

(58) Field of Classification Search
CPC combination set(s) only.
See application file for complete search history.

(56) References Cited

U.S. PATENT DOCUMENTS

| | | | |
|---|---|---|---|
| 8,881,507 B2 * | 11/2014 | Yan | F04B 9/12 60/286 |
| 9,371,830 B2 | 6/2016 | Moffitt, Jr. | |
| 9,371,831 B2 | 6/2016 | Moffitt, Jr. | |
| 9,546,584 B2 * | 1/2017 | Qi | F01N 3/208 |
| 9,751,749 B1 | 9/2017 | Moffitt, Jr. | |
| 9,856,131 B1 | 1/2018 | Moffitt, Jr. | |
| 10,017,374 B1 | 7/2018 | Moffitt, Jr. | |
| 10,106,396 B1 | 10/2018 | Moffitt, Jr. | |

(Continued)

FOREIGN PATENT DOCUMENTS

EP 3156621 A1 4/2017

OTHER PUBLICATIONS

International Search Report & Written Opinion for International Application No. PCT/US2020/042648, report dated Dec. 8, 2020; pp. 1-17.

*Primary Examiner* — Binh Q Tran
(74) *Attorney, Agent, or Firm* — Bracewell LLP

(57) ABSTRACT

An automated diesel exhaust fluid (DEF) system and method for refilling DEF. The automated DEF system provides DEF refilling after an initial setup and without manual intervention. The automated DEF system includes a electric DEF flow control device that controls the flow of DEF. The electric DEF flow control device may include control circuitry, an electrics enclosure that encloses the control circuity, an electric fluid sensor, a valve, a beacon light, a status light, a button, a threaded swivel connection, and a mandrel on the inside of the threaded swivel connection.

20 Claims, 5 Drawing Sheets

(56) References Cited

U.S. PATENT DOCUMENTS

| | | |
|---|---|---|
| 10,344,659 B2 | 7/2019 | Turbak et al. |
| 10,604,403 B2 | 3/2020 | Schmidt |
| 11,066,290 B2 | 7/2021 | Schmidt |
| 2010/0199648 A1* | 8/2010 | Op De Beeck ....... F01N 3/2066 60/303 |
| 2010/0200107 A1 | 8/2010 | Weathers et al. |
| 2012/0073264 A1* | 3/2012 | Li ........................... F01N 3/208 60/274 |
| 2012/0160934 A1* | 6/2012 | Ponnathpur ........... F01N 3/2066 239/289 |
| 2016/0222856 A1* | 8/2016 | Kato ....................... F01N 3/208 |
| 2017/0101914 A1* | 4/2017 | Farmer ................. F01N 3/2066 |
| 2017/0254243 A1 | 9/2017 | Hudgens |
| 2019/0170045 A1 | 6/2019 | Rosenfeldt et al. |
| 2019/0270632 A1 | 9/2019 | Schmidt |
| 2019/0359475 A1 | 11/2019 | Schmidt |

\* cited by examiner

AUTOMATED DIESEL EXHAUST FLUID (DEF) SYSTEM AND METHOD

CROSS-REFERENCE TO RELATED APPLICATIONS

This application claims priority from U.S. Provisional Application No. 62/876,307 filed Jul. 19, 2019, and titled "AUTOMATED DIESEL EXHAUST FLUID (DEF) SYSTEM AND METHOD." For purposes of United States patent practice, this application incorporates the contents of the Provisional Application by reference in its entirety.

BACKGROUND

Field of the Disclosure

The present disclosure generally relates to the operation of diesel engines. More specifically, embodiments of the disclosure relate to controlling emissions from such engines using diesel exhaust fluid (DEF).

Description of the Related Art

As environmental standards have become more strict, diesel exhaust fluid (DEF) has been used to reduce emissions from diesel engines. Some diesel engines, such as those used in oil and gas operations such as fracking, may burn significant amounts of DEF. In such environments, DEF is manually refilled at the equipment using a trailer with a tank, a pump, and hose reel. However, this manual refilling may be labor intensive, time consuming, and expensive. In addition, the manual refilling may increase dirt and contamination due to the frequent removal of caps and exposure of the tanks to dirt and dust in the air. Additionally, the hoses may be dragged in the dirt and may also introduce contaminants into the DEF tanks from the end of the nozzle. The manual refilling also may also introduce human error regarding the frequency of refilling and the consistency in following proper procedure.

SUMMARY

In one embodiment, a diesel exhaust fluid (DEF) refilling system is provided. The system includes a supply tank having DEF, a supply line connecting the supply tank to a DEF tank configured to supply DEF to a diesel engine, and a DEF flow control device in fluid communication with the main supply line. The DEF flow control device includes an enclosure containing control circuitry and a valve having an inlet and an outlet and moveable between an open position and a closed position, the open position configured to enable DEF flow through the valve and the closed position configured to block DEF flow through the valve, the valve outlet in fluid communication with the DEF tank. The DEF flow control device also includes a valve actuator operable to move the valve between the open position and the closed position and an electric fluid sensor disposed in a sensor housing and having a shaft extending into the DEF tank, the shaft having a slot such that the electric fluid sensor senses DEF when the slot is submerged. The DEF flow control device also includes a battery configured to power the control circuitry, the valve actuator, and the electric fluid sensor. The control circuitry includes logic configured to move the valve between the open position and the closed position in response to a signal provided by the electric fluid sensor.

In some embodiments, the system includes a feeder line, the feeder line further connecting the main supply line to the DEF tank. In some embodiments, the supply tank is positioned on a deck of a frame raised to a higher elevation than an inlet of the DEF tank. In some embodiments, the supply tank is positioned on a trailer having a pump operable to supply DEF from the supply tank at a minimum pressure. In some embodiments, the diesel engine provides power to a fluid pump. In some embodiments, the DEF flow control device includes a first light and second light, the first light configured to indicate an alarm and the second light configured to indicate operation of the electric fluid sensor. In some embodiments, the DEF flow control device includes a button configured to initiate operation of the electric fluid sensor. In some embodiments, the valve is a motorized ball valve. In some embodiments, the valve is a solenoid valve. In some embodiments, the DEF flow control device includes a threaded swivel connection configured to couple the DEF flow control device to the DEF tank. In some embodiments, the DEF flow control device includes a mandrel coupled to the electric fluid sensor, such that the mandrel having a DEF fill port in fluid communication with the DEF tank and the valve outlet is in fluid communication with the DEF fill port.

In another embodiment, a diesel exhaust fluid (DEF) flow control device is provided. The DEF flow control device includes an enclosure containing control circuitry and a valve having an inlet and an outlet and moveable between an open position and a closed position, the open position configured to enable DEF flow through the valve and the closed position configured to block DEF flow through the valve, the valve outlet in fluid communication with the DEF tank. The DEF flow control device also includes a valve actuator operable to move the valve between the open position and the closed position and an electric fluid sensor disposed in a sensor housing and having a shaft extending into the DEF tank, the shaft having a slot such that the electric fluid sensor senses DEF when the slot is submerged. The DEF flow control device also includes a mandrel coupled to the electric fluid sensor and having a DEF fill port for providing fluid to a DEF tank, such that the valve outlet is in fluid communication with the DEF fill port. The DEF flow control device further includes a battery configured to power the control circuitry, the valve actuator, and the electric fluid sensor. The control circuitry includes logic configured to move the valve between the open position and the closed position in response to a signal provided by the electric fluid sensor.

In some embodiments, the valve is a motorized ball valve. In some embodiments, the valve is a solenoid valve. In some embodiments, the DEF flow control device includes a threaded swivel connection configured to couple the DEF flow control device to the DEF tank. In some embodiments, the DEF flow control device includes a pressure gauge configured to measure pressure at the inlet.

In some embodiments, a method of controlling diesel exhaust fluid (DEF) flow to a DEF tank for a diesel engine. The method includes using a DEF flow control device coupled to the DEF tank, the DEF flow control device configured to stop the flow of DEF from a supply tank when the DEF flow control device detects fluid via an electric fluid sensor extending into the DEF tank. The DEF flow control device includes an enclosure containing control circuitry and a valve having an inlet and an outlet and moveable between an open position and a closed position, the open position configured to enable DEF flow through the valve and the closed position configured to block DEF flow through the valve, the valve outlet in fluid communication with the DEF tank. The DEF flow control device also includes a valve actuator operable to move the valve between the open position and the closed position and the electric fluid sensor disposed in a sensor housing and having a shaft extending into the DEF tank, the shaft having a slot such that the electric fluid sensor senses DEF when the slot is submerged. The DEF flow control device also includes a battery configured to power the control circuitry, the valve actuator, and the electric fluid sensor. The control circuitry includes logic configured to move the valve between the open position and the closed position in response to a signal provided by the electric fluid sensor.

In some embodiments, the DEF flow control device is in fluid communication with a supply line of a gravity fed system. In some embodiments, the diesel engine provides power to a fluid pump. In some embodiments, the valve is a motorized ball valve.

In another embodiment, a diesel exhaust fluid (DEF) refilling system is provided. The system includes a supply tank having DEF and positioned at a higher elevation than an inlet of a DEF tank configured to supply DEF to a diesel engine, a supply line connecting the supply tank to the DEF tank, and a DEF flow control device in fluid communication with the supply line, the DEF flow control device configured to enable DEF to flow via gravity from the supply tank into the DEF tank when the DEF in the DEF tank is below a predetermined level and configured to block DEF flow into the DEF tank when the DEF in the DEF tank is at the predetermined level.

In some embodiments, the system includes a feeder line, the feeder line further connecting the main supply line to the DEF tank. In some embodiments, the supply tank is positioned on a deck of a frame raised to the higher elevation. In some embodiments, the diesel engine provides power to a fluid pump.

In another embodiment, a DEF flow control device is provided. The DEF flow control device includes an enclosure containing control circuitry and a valve having an inlet and an outlet and moveable between an open position and a closed position, the open position configured to permit DEF flow through the valve and the closed position configured to block DEF flow through the valve outlet, the valve outlet in fluid communication with a DEF fill port. The DEF flow control device further includes a valve actuator operable to move the valve between the open position and the closed position, means for sensing DEF in a DEF tank and generating a signal in response thereto, a mandrel comprising a DEF fill port for providing fluid to the DEF tank, such that the valve outlet is in fluid communication with the DEF fill port. The control circuitry includes logic configured to move the valve between the open position and the closed position in response to the signal.

DETAILED DESCRIPTION

The present disclosure will be described more fully with reference to the accompanying drawings, which illustrate embodiments of the disclosure. This disclosure may, however, be embodied in many different forms and should not be construed as limited to the illustrated embodiments. Rather, these embodiments are provided so that this disclosure will be thorough and complete, and will fully convey the scope of the disclosure to those skilled in the art.

Embodiments of the disclosure include an automated DEF system and process that provides DEF refilling after an initial setup and without manual intervention. The automated DEF system and process reduces or eliminates the time and labor associated with manual DEF refilling and creates a cleaner environment for tanks, the DEF, and the associated equipment. The automated DEF system includes an electric DEF flow control device that controls the flow of DEF to DEF tanks located at a diesel engine (for example, a pump).

In some embodiments, the DEF may be supplied using a gravity-fed system or a pump-based system. For example, in some embodiments, a pump based system may include a pump that maintains a specific range of pressures. In some embodiments, the gravity-fed system may be similar to that described in U.S. Pat. No. 10,604,403, a copy of which is incorporated by reference in its entirety.

Figure 1:
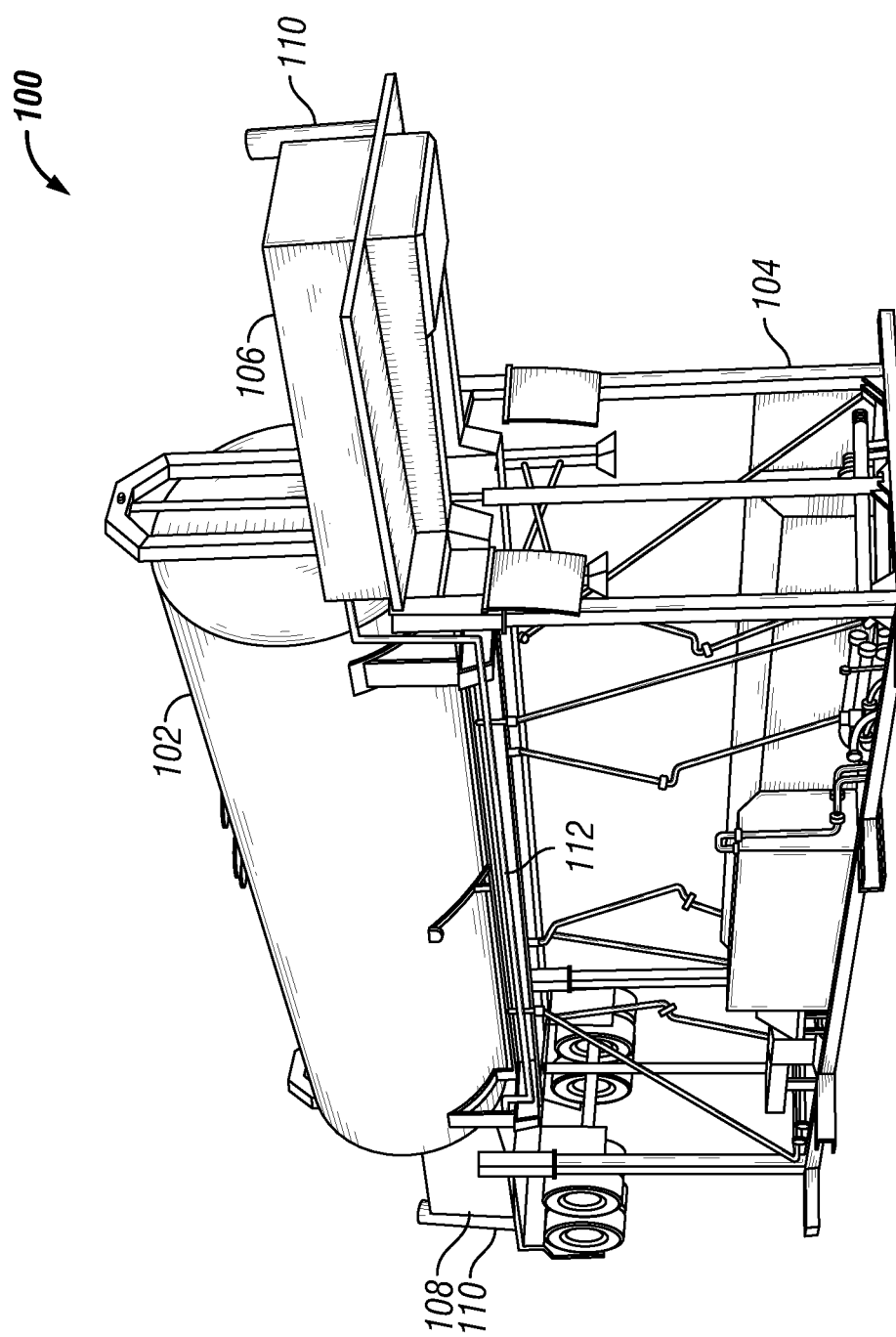
FIG. 1 depicts a side perspective view of a bulk storage tank fluid reservoir of an example gravity-fed system in a raised orientation in accordance with an embodiment of the disclosure.

For example, FIG. 1 depicts a side perspective view of a bulk storage tank fluid reservoir 102 of an example gravity-fed system 100 in a raised orientation of an external frame 104 in accordance with an embodiment of the disclosure. As shown in FIG. 1, a first DEF supply tank 106 may be positioned on a front deck of the external frame and a second DEF supply tank 108 may be positioned on a rear deck of the external frame. Each DEF supply tank may include a sight tube 110 for determining the DEF level in the tank. In some embodiments, the supply tanks may be connected by an equalization line 112. In some embodiments, the DEF supply tanks may also include electric level monitors.

Figure 2:
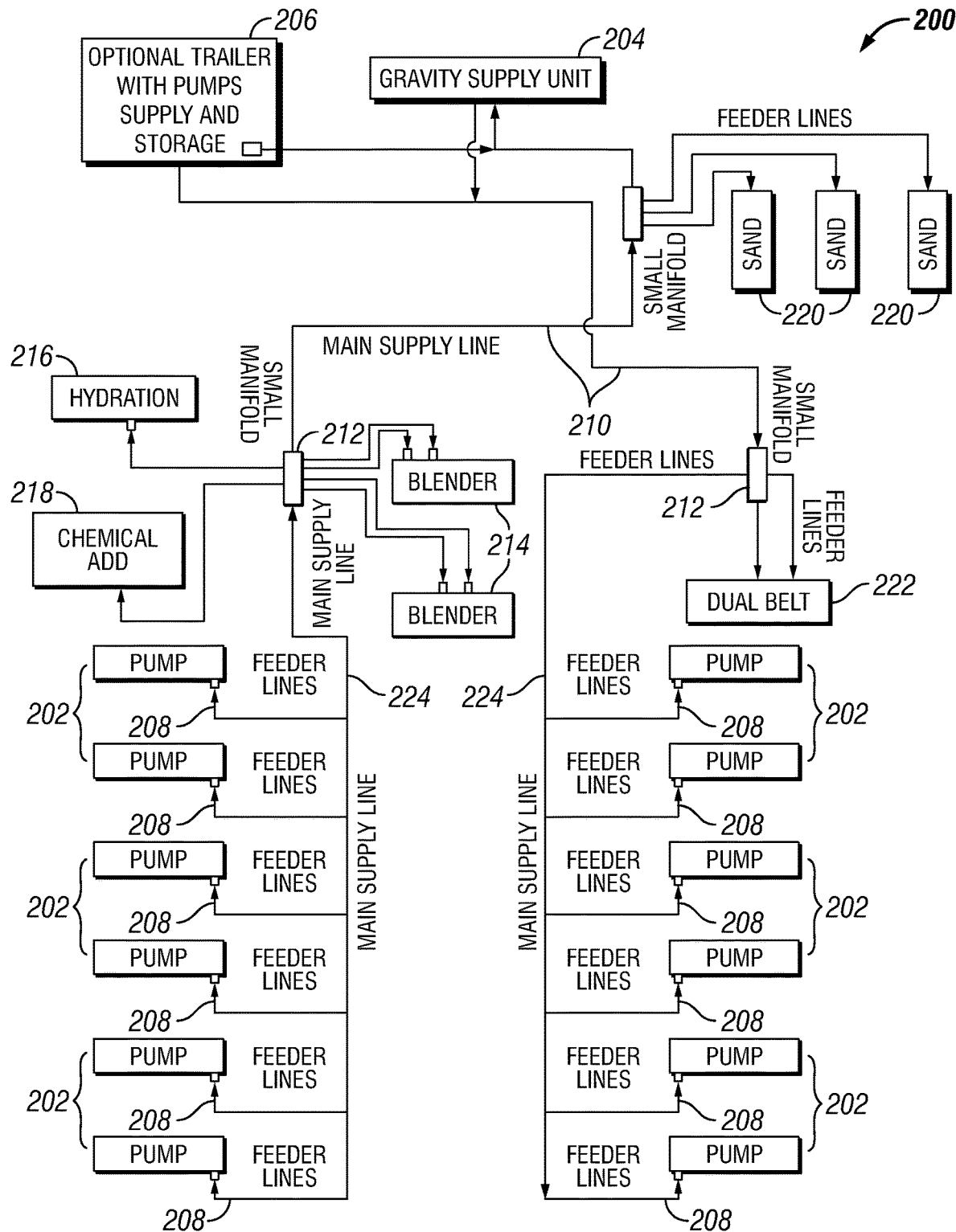
FIG. 2 depicts a schematic view of a representative layout of a DEF system used with various diesel engines in accordance with an embodiment of the disclosure.

FIG. 2 depicts a schematic view of a representative layout of a DEF system 200 used with diesel engines (for example, pumps 202 and other equipment) in accordance with an embodiment of the disclosure. FIG. 2 illustrates a gravity supply unit 204 representative of an elevated DEF supply tank that enables gravity supply of DEF, such as shown in FIG. 1. The connections shown in FIG. 2 are described with reference to a gravity-fed system having the gravity supply unit 204 shown in FIG. 2. However, it should be appreciated that the connections shown in FIG. 2 may be generally applicable to embodiments using a pump-based system. For example, FIG. 2 also shows a trailer 206 having a pump-based DEF supply and a DEF storage.

As shown in FIG. 2, the feeder lines 208 may be connected to main supply lines 210 that route from the gravity supply unit 204 to the first pump 202. In some embodiments, the main supply lines 210 are 1 inch diameter lines. Each bank of pumps 202 may have a main supply line. In some embodiments, the main supply lines 210 from the gravity supply unit 204 to the first pump 202 may not include any connections except for a "no-drip" stainless steel quick connect on the ends of the lines, male by female. In other embodiments, other types of connections may be used. When a main supply line reaches equipment that uses DEF, a manifold 212 may be connected to the line. That manifold may have the same size connections on each end as the main supply lines 210. In some embodiments, the manifold is stainless steel and may have multiple ports (for example, about 0.5 inch ports) to connect equipment to the main supply line with smaller lines (for example, 0.5 inch in diameter). In some embodiments, the smaller lines may have "no drip" stainless quick connects, male by female. In other embodiments, other types of connections may be used. FIG. 2 also depicts other equipment such as, for example, blenders 214, hydration units 216, chemical addition units 218, sand belts 220, and dual belt 222, that may, in some embodiments, include or be powered by diesel engines and use the DEF system 200 described in the disclosure.

After the main supply lines are routed to the first pump on each bank, a pump main supply line 224 may be used to further supply each piece of equipment (for example, pumps 202). In some embodiments, each pump main supply line 224 may include tees located at constant intervals to connect feeder lines 208 to each piece of equipment. In some embodiments, a pump main supply line 224 may include tees about every 11 feet, and the tees may include 0.5 inch connections for coupling to 0.5 inch diameter feeder lines. In some embodiments, four pieces of equipment may be able to connect to one pump main supply line, with the lines running behind the pumps. Advantageously, this configuration enables pumps to be easily replaced, swapped out, or pulled forward for maintenance without interference with the lines.

Figure 3:
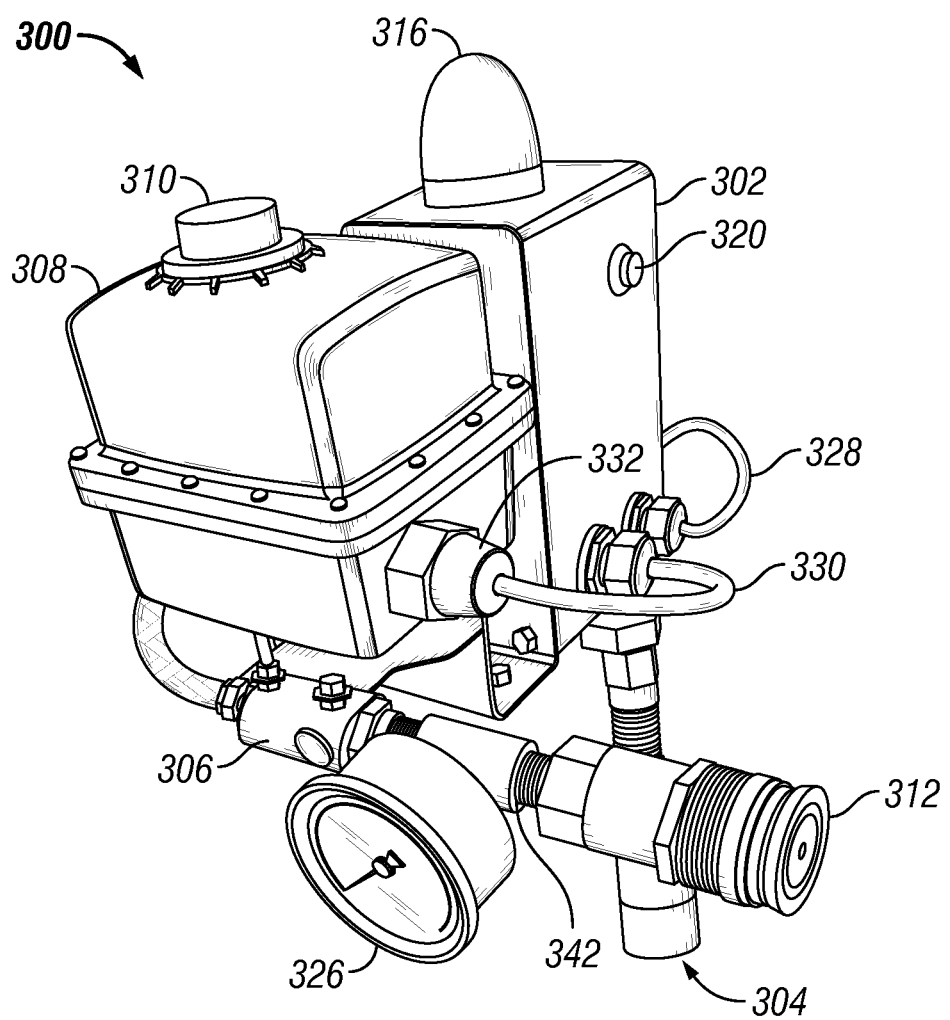
FIGS. 3 and 4 are 3-D perspective views respectively of a electric DEF flow control device in accordance with an embodiment of the disclosure.
Figure 4:
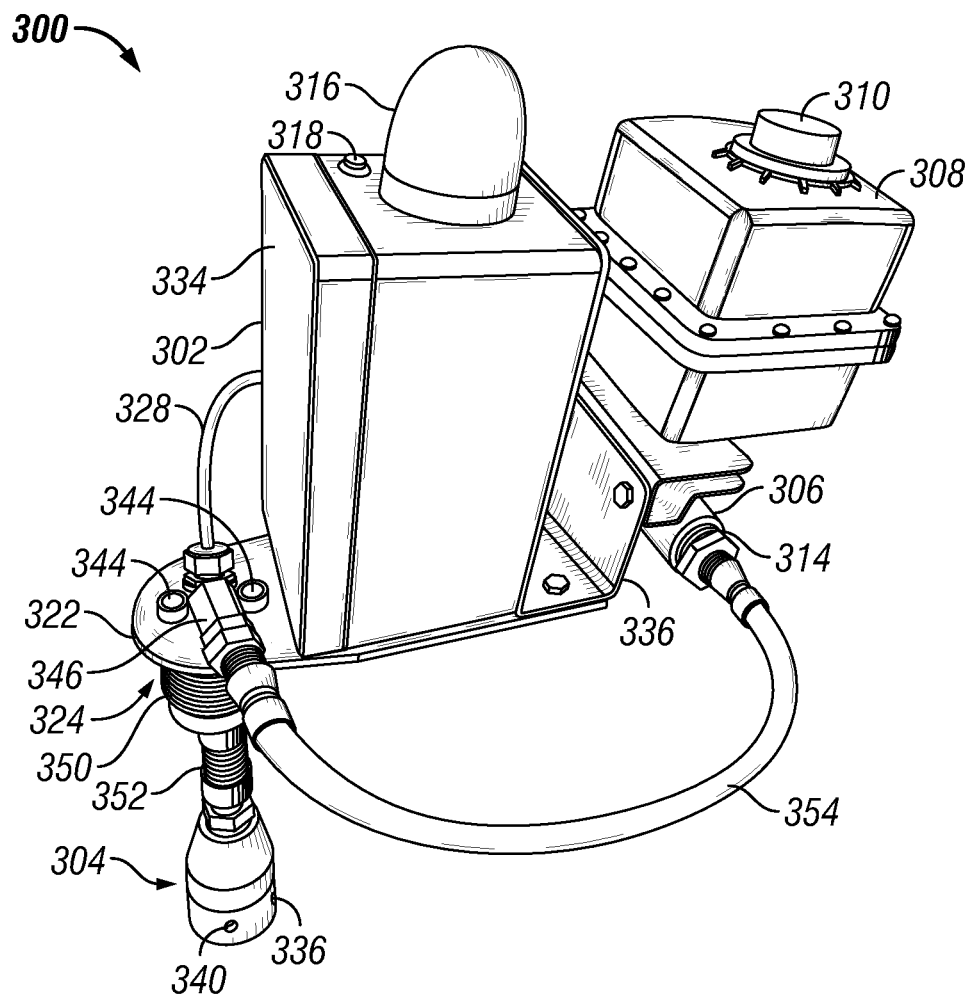
Figure 5:
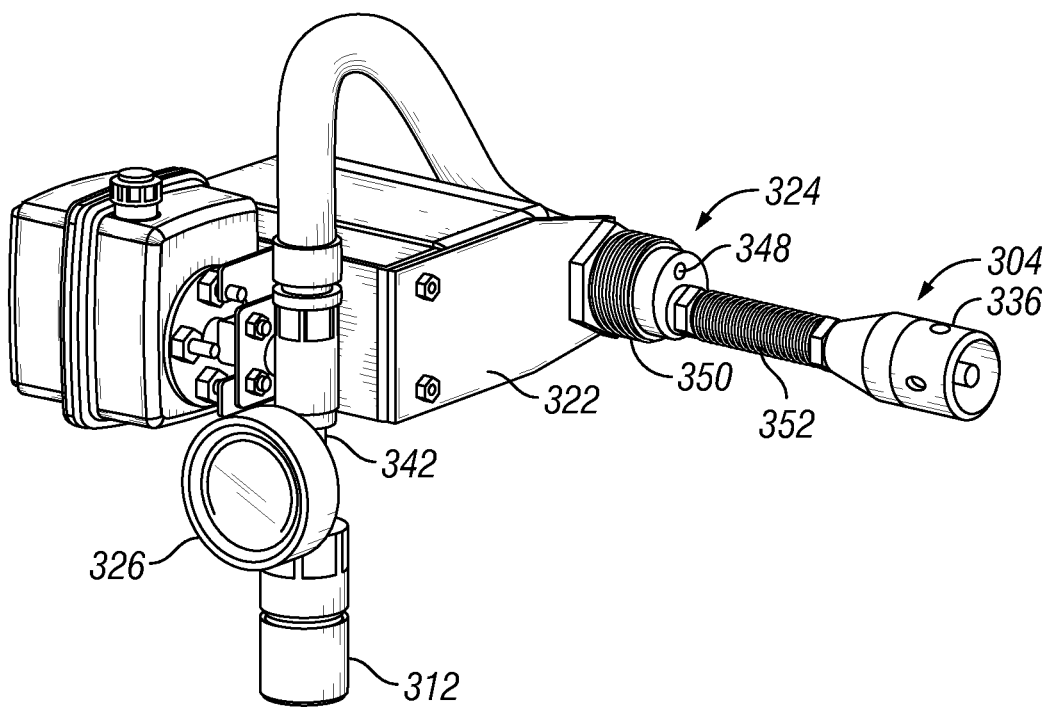
FIGS. 5 and 6 are 3-D bottom perspective views of the electric DEF flow control device of FIGS. 3 and 4 in accordance with an embodiment of the disclosure.
Figure 6:
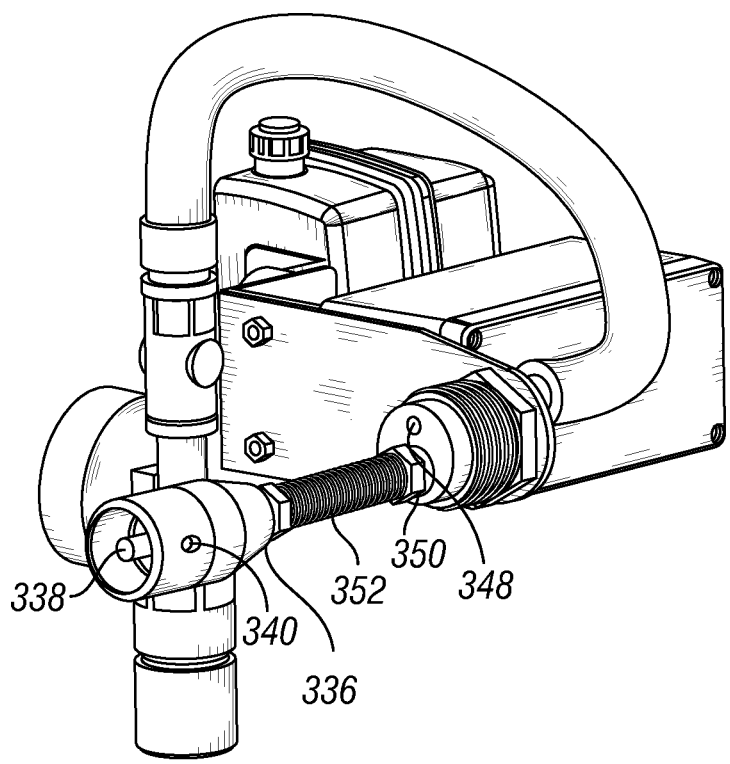

The automated DEF system includes a DEF flow control device. Components of the electric DEF flow control device 300 are shown in FIGS. 3-6 and described below. FIGS. 3 and 4 depict front and rear perspective views of the electric DEF flow control device 300 in accordance with an embodiment of the disclosure. FIGS. 5 and 6 depict 3-D perspective views of the bottom of the electric DEF flow control device 300 in accordance with an embodiment of the disclosure.

The electric DEF flow control device 300 includes an electronics enclosure 302 that encloses control circuitry and a battery, an electric fluid sensor 304, a motorized ball valve 306 and ball valve actuator 308, a ball valve position indicator 310, connector 312 (for example, a quick connect) on one side of the motorized ball valve 306, and on another side of the motorized ball valve a series of connections and hose 354 (for example, a stainless steel hose) that connects the discharge side of the motorized ball valve 306 to the top of the mandrel 324, a beacon light 316, a status light 318, a button 320, a component plate 322, a mandrel 324, and a pressure gauge 326.

The electronics enclosure 302 may include one or more batteries. In some embodiments, the electronics enclosure 302 includes three D cell batteries. In other embodiments, other batteries may be included. In other embodiments, other batteries may be included. Additionally or alternatively, the electric DEF flow control device 300 may be powered by other power sources, such as on-board batteries or solar power.

The control circuitry in the electronics enclosure 302 may include hardware and/or software logic to control the operation of the electric DEF flow control device 300, such as the operation of the electric fluid sensor 304 and the motorized ball valve 306. For example, in some embodiments the control circuitry may include a programmable microcontroller or a field programmable gate array (FPGA). The control circuitry may have different configurations depending on the desired operation of the electric DEF flow control device 300. In some embodiments, the control circuitry includes or is implemented on a circuit board. The control circuitry may also include a radio receiver, transmitter, or transceiver for radio communication, such as with personnel at the wellsite or a communication hub. In some embodiments, the control circuitry may include a network interface for communication over various networks. In such embodiments, the electric DEF flow control device 300 may communicate a status to a remote device. The status may be communicated periodically, in response to a change in operation of the device 300, or a combination thereof. In some embodiments, the control circuitry enables hands free and automatic operation of the electric DEF flow control device 300. In some embodiments, the control circuitry initiates a battery function test periodically or on demand. In such embodiments, the control circuitry may initiate a notification if a battery fails. In some embodiments, the notification includes flashing the beacon light 316 in a pattern (for example, 3 times every 15 seconds).

The electronics enclosure 302 that encloses the control circuitry may be weatherproof and enclose other components of the electric DEF flow control device 300. In some embodiments, the electronics enclosure 302 may enclose the battery and may include connections to other components of the electric DEF flow control device 300, such as connections to the electric fluid sensor 304, the motorized ball valve 306, the beacon light 316, the status light 318, and the button 320. For example, in some embodiments a sensor wire 328 may be coupled to a side of the electronics enclosure 302 and enable electrical communication with the electric fluid sensor 304. In some embodiments, a valve control wire 330 may be coupled to a side of the electronics enclosure 302 (for example, via valve control wire connector 332) and enable electrical communication with the motorized ball valve 306. In some embodiments, the electronics enclosure 302 includes a removable lid 334 that provides access to the interior of the electronics enclosure 302 but seals the enclosure 302 from liquids and particulates such as dust when attached. The removable lid 334 may be secured to another portion of the electronics enclosure 302 via fasteners (for example, screws).

The electric DEF flow control device 300 includes a dampening bracket 336 that secures the electronics enclosure 302 (that is, to secure the internal components such as the control circuitry and battery), ball valve 306, ball valve actuator 308 to the component plate 322 of the electric DEF flow control device 300. The bracket 336 may reduce or eliminate vibration of components during handling and operation of the electric DEF flow control device 300. The bracket 336 may be secured to the electronics enclosure 302, ball valve 306, ball valve actuator 308, and other components via fasteners such as bolts, screws, or other suitable fasteners.

In some embodiments, the electric fluid sensor 304 may be formed from stainless steel and may have dimensions that reduces the footprint of the electric DEF flow control device 300. In some embodiments, the electric fluid sensor 304 is housed in a sensor housing 336 and includes a shaft 338 inside the sensor housing 336. The shaft 338 includes an opening (for example, a slot or a notch). The electric fluid sensor 304 transmits an ultrasonic signal across the opening that is only detectable when the opening is immersed in fluid, thus indicating that fluid is present. As shown in the figures, the sensor housing 336 includes holes 340 to allow fluid into the sensor housing 336 to contact the shaft 338.

The interior of the sensor housing 336 may include a threaded connection which, in some embodiments, may also include a sealing component (such as an o-ring), such that the sensor shaft 338 protrudes from the bottom of the housing 336. In some embodiments, the sensor housing 336 may have a length longer than the sensor shaft 338 to protect the end of the sensor shaft 338. The upper portion of the sensor housing 336 includes a recess that houses some of the upper portion of the sensor 304. The upper portion of the sensor housing 336 may couple to the lower portion via a threaded connection and a sealing component (such as an o-ring). In some embodiments, the outside of the upper portion of the sensor housing 336 is tapered to enable easier removal from the connection port on a DEF tank. The top side of the upper portion of the sensor housing may include a threaded portion (for example, a 0.5 inch NPT thread) to couple to the flexible hose 352 which couples the sensor housing to the mandrel 324.

In other embodiments, other sensing devices or technologies may be used to detect the presence of fluid instead of the electric fluid sensor 304. For example, in other embodiments the electric DEF flow control device 300 may include a vibration sensor, a pressure transducer, radar, a rod sensor, a float switch, or other types of sensing devices or technologies.

The motorized ball valve 306 may be configured to move between a closed position that blocks DEF flow and an open position that enables DEF flow. The movement between the open position and closed position may be controlled by the control circuity in response to a signal from the electric fluid sensor 304. The motorized ball valve may include an electric motor (included in or housed in the ball valve actuator 308) and a stainless steel ball valve. In other embodiments, the ball valve may be formed from brass or carbon steel. The electric motor may open and close the ball valve 306 to enable movement between the open position and closed position. In some embodiments, the motorized ball valve 306 includes the valve position indicator 310, such as on top of the ball valve actuator 308, which indicates whether the motorized ball valve 306 is open or closed. The valve position indicator 310 may enable a technician to visually verify the position of the motorized ball valve 306. In other embodiments, other types of valves may be used instead of the motorized ball valve 306. For example, in other embodiments the electric DEF flow control device 300 may include a solenoid valve, a pneumatic valve, or other type of valve.

The motorized ball valve 306 may be coupled to the connector 312 via a tee connector 342 that enables connection of the pressure gauge 326. The pressure gauge 326 may enable visual monitoring of the pressure of the DEF received by the motorized ball valve 306.

In some embodiments, the beacon light 316 is a light emitting diode (LED), such as a red LED. In other embodiments, other types of lights may be used. In some embodiments, the beacon light 316 is positioned to be visible from all sides of the electric DEF flow control device 300, such as on top of the electronics enclosure 302. In some embodiments, the beacon light 316 provides an indicator for notifications (for example, alarms) of the electric DEF flow control device 300. For example, in some embodiments the beacon light 316 indicates when the device has not sensed fluid for a configurable period of time, thus indicating a potential issue with the automated DEF system or tanks. The beacon light 316 may also indicate when the device is put into standby mode, when the device is put into operational mode, when the device has a low battery, and other possible indications.

In some embodiments, the status light 318 is a light emitting diode (LED), such as a green LED. In other embodiments, other types of lights may be used. In some embodiments, the status light 318 is positioned to be visible from all sides of the electric DEF flow control device 300, such as on top of the electronics enclosure 302. In some embodiments, the status light 318 provides an indicator of activity of the electric DEF flow control device 300. For example, in some embodiments the status light 318 may flash each time the control circuitry receives or obtains a signal from the electric fluid sensor 304. In some embodiments, the status light 318 may flash when the button of the electric DEF flow control device 300 is pushed, or as a status light 318 that flashes to show normal operating condition The button 320 may be weatherproof and may initiate one or more functions of the electric DEF flow control device 300. In some embodiments, the button 320 may perform different functions based on the duration of a button 320 press. For example, in some embodiments pushing the button 320 for a first duration (such as less than 1 second) may initiate obtaining a signal from the electric fluid sensor 304 (that is, immediate activation of the electric fluid sensor), such as for testing the device and activating the device to verify normal operation. In another example, pushing the button 320 for a second duration (such as greater than 10 seconds) may cause the device to enter into an operational or standby mode. It should be appreciated that the button 320 may be programmed to perform different or additional functions.

The component plate 322 couples to the mandrel 324 via fasteners (for example, bolts 344), and corresponding holes and to the bracket via the previously mentioned fasteners The component plate 322 may provide access to the mandrel 324 for routing of the sensor wire to the electric fluid sensor and for connection of the motorized ball valve 306 to the mandrel DEF port.

As shown in the figures, electric DEF flow control device 300 includes additional components that enable insertion of the electric fluid sensor 304 into a DEF tank and flow of DEF into a DEF tank (as controlled by the motorized ball valve 306). The electric DEF flow control device 300 includes a 90-degree connector 346, a DEF fill port 348 in the mandrel 324, a threaded swivel connector 350 (for example, a 1.5 inch National Pipe Tapered (NPT) threaded swivel connector), and a flexible hose 352 that couples the mandrel 324 to the electric fluid sensor 304.

The component plate 322 may secure the threaded swivel connection 350 on the mandrel 324 on the top side to maintain the connection between the greater outer diameter below and the plate 322 above. Additionally, the component plate 322 may secure the bracket 336 that supports the enclosure 302.

The threaded swivel connection 350 may include a hexagonal upper end and a threaded lower end. The threaded swivel connection 350 may include an internal o-ring receptacle (for example, a groove) and an o-ring in the receptacle to seal the connector 350 to the mandrel 324 and prevent water and debris from entering a DEF tank.

The upper portion of the mandrel 324 has an outer diameter that fits inside the threaded swivel connection 350 and may seal against the internal o-ring of the threaded swivel connection 350. The lower portion of the mandrel 324 has a larger outer diameter that may prevent the threaded swivel connection 350 from sliding off of the bottom, thus retaining the threaded swivel connection 350. The mandrel 324 may include two ports at the top side with two bolt holes. One port may be used as a DEF fill port and allows DEF to pass through the port and into a DEF tank. The 90-degree connector 346 may be coupled to the top side of the mandrel 324 and connected to the port. The other port may be used as a path to route the sensor wire 328 for the electric fluid sensor 304. In some embodiments, the ports may each be a 0.25 inch NPT port. The bottom side of the mandrel 324 may include holes or ports that connect to the two ports on the top side of the mandrel. For example, in some embodiments the bottom side may include a 0.25 inch straight hole and a 0.5 inch NPT port. The 0.25 inch straight hole may be used as the DEF fill port 348 for the DEF flow and may connect to the upper 0.25 inch NPT port. The 0.5 inch NPT port may connect to the other upper 0.25 inch NPT port for the sensor cable path and provides a connection point for the flexible hose 352 from the sensor housing.

As also shown in the figures, the electric DEF flow control device 300 includes a hose 354 connecting the 90-degree connector 346 to the connector 314 of the motorized ball valve 306. The other connector 312 of the motorized ball valve 306 may be connected to a feeder line for DEF (for example, from a gravity supply tank), such that the motorized ball valve 306 controls the flow of DEF from the feeder line to the DEF fill port and into a DEF tank. In some embodiments, the hose 354 may be a stainless steel hose. It should be appreciated that FIGS. 5 and 6 illustrate a different embodiment in which a hose is connected to the mandrel 324 and connector 314 via different connectors that the 90-degree connector 346. For example, the hose shown in FIGS. 5 and 6 may be a rubber hose. Additionally, FIGS. 5 and 6 omit illustration of the sensor wire for clarity.

In some embodiments, the flexible hose 352 may be a 0.5 inch diameter stainless steel hose. The flexible hose 352 may provide a path for routing the sensor wire to the electric fluid sensor 304. Additionally, the flexible hose 352 may provide a flexible connection between the mandrel 324 and the sensor housing 336 to enable the electric DEF flow control device 300 to be installed on obstructed DEF tanks (that is, DEF tanks with obstacles above the connection port).

Advantageously, the electric DEF flow control device 300 may run solely on battery power without using solar power or other external power sources. In some embodiments, the battery may be of sufficient capacity to enable the electric DEF flow control device 300 to operate for a time period of at least 6 months. Moreover, the electric DEF flow control device 300 is compact and does not require any external connections or signals to operate. For example, the electric DEF flow control device 300 does not require a cable or a central control unit and eliminates the risk of a bad cable or network connection. Thus, the electric DEF flow control device 300 may function alone without any other devices and does not require proximity to any other devices (that is, it may operate at unlimited distances).

In some embodiments, the electric DEF flow control device 300 may be used with a gravity-fed system, such as that described in U.S. Pat. No. 10,604,403 The electric DEF flow control device 300 may enable automated DEF flow control, such that the DEF is provided to equipment without manual intervention from a technician. In such embodiments, DEF may flow from the gravity unit, through the main supply lines into the feeder lines, and through the electric DEF flow control device 300 into a DEF tank. When the electric fluid sensor 304 senses fluid (that is, when the fluid in the tank has reached a desired level), the electric DEF flow control device 300 may move the motorized ball valve to the closed position and stop the flow of fluid. The electric DEF flow control device 300 periodically obtains a signal from the electric fluid sensor 304 at programmable intervals (that is, intervals programmed into and stored by the control circuity). If the electric fluid sensor 304 does not detect any fluid for a programmable time period (that is, a time period programmed into and stored by the control circuity), the electric DEF flow control device 300 may move the motorized ball valve 306 to the open position and enable the flow of fluid to refill the DEF tank. Thus, in order for the motorized ball valve 306 to move to the open position after closing, the electric fluid sensor 304 must by "dry" (that is, not sensing fluid) for the time period. When the electric fluid sensor 304 subsequently senses fluid (that is, when the fluid in the tank has reached a desired level), the electric DEF flow control device 300 may move the motorized ball valve to the closed position and stop the flow of fluid.

In other embodiments, the electric DEF flow control device 300 may be used as for automated DEF control on other types of systems, such as pump-based system or other types of DEF supply.

Installation of the electric DEF flow control device 300 will be described with reference to a gravity-fed system, such as that described in U.S. Pat. No. 10,604,403. However, it should be appreciated that the installation procedure described herein may be applicable and similar to other types of fluid systems.

Initially, the electric DEF flow control device 300 may be delivered in a package (for example, a box) to a wellsite or other location where the electric DEF flow control device 300 is to be used, and removed from the package when ready for installation.

In some embodiments, the electric DEF flow control device 300 may remain permanently on (such that all components are operational and cannot be unpowered from the power source). In other embodiments, the electric DEF flow control device 300 may include an on/off control (for example, an on/off switch or a specific configuration of the button 320). Before use, the electric DEF flow control device 300 may be cleaned. After cleaning, the button 320 may be depressed and released to activate of the electric fluid sensor 304. The electric fluid sensor 304 will not sense any fluid, and the motorized ball valve 306 will move to the open position. The sensor 304 shaft of the electric DEF flow control device 300 may be submerged in DEF, and the button 320 may be depressed and released again to activate the electric fluid sensor 304. The electric fluid sensor 304 will sense fluid, and the motorized ball valve 306 will move to the closed position. The electric DEF flow control device 300 may remain in the closed position for installation.

Next, the electric DEF flow control device 300 may be installed on a DEF tank, such as by screwing the threaded swivel connection 350 to a connection port on the DEF tank. A feeder line from the main supply line of the gravity-fed system may be coupled to the inlet side of the motorized ball valve 306 of the electric DEF flow control device 300. The button 320 may be depressed and released to activate the electric fluid sensor 304. If the electric sensor 304 does not detect any fluid, the motorized ball valve 306 may move to the open position and the DEF tank will be filled with DEF. If sensor 304 senses fluid, the motorized ball valve 306 will move to the closed position.

The electric DEF flow control device 300 may be manually and periodically checked (for example, every 30 minutes) by observing the status, including observing the status light 318.

In some embodiments, the electric DEF flow control device 300 may be checked remotely. Additionally, operation of the electric DEF flow control device 300 may be checked by observing an indication of fluid sensor 304 operation (for example, flashing of the status light 318). For example, in some embodiments a particular flashing sequence of the beacon light 316 may indicate that the electric fluid sensor 304 has not sensed fluid in about 6 hours, thus indicating a potential supply issue or system issue. In another example, a particular flashing sequence of the beacon light 316 (for example, 3 flashes every 15 seconds) may indicate a low battery that needs replacement. The status light 318 may also be observed to indicate proper functioning of the electric DEF flow control device 300.

If the electric DEF flow control device 300 indicates an alarm (for example, by flashing the status light 318), the automated DEF system may be diagnosed and the electric DEF flow control device 300 may be reset when the system has returned to normal operation.

Ranges may be expressed in the disclosure as from about one particular value, to about another particular value, or both. When such a range is expressed, it is to be understood that another embodiment is from the one particular value, to the other particular value, or both, along with all combinations within said range.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used in the disclosure are for organizational purposes only and are not meant to be used to limit the scope of the description.

What is claimed is:

1. A diesel exhaust fluid (DEF) refilling system, comprising:
    a supply tank comprising DEF;
    a supply line connecting the supply tank to a DEF tank configured to supply DEF to a diesel engine;
    a DEF flow control device in fluid communication with the supply line, the DEF flow control device comprising:
        an enclosure containing control circuitry;
        a valve having an inlet and an outlet and moveable between an open position and a closed position, the open position configured to permit DEF flow through the valve and the closed position configured to block DEF flow through the valve, the valve outlet in fluid communication with the DEF tank;
        a valve actuator operable to move the valve between the open position and the closed position;
        an electric fluid sensor disposed in a sensor housing and comprising a shaft extending into the DEF tank, the shaft comprising a slot such that the electric fluid sensor senses DEF when the slot is submerged; and
        a battery configured to power the control circuitry, the valve actuator, and the electric fluid sensor,
        wherein the control circuitry comprises logic configured to move the valve between the open position and the closed position in response to a signal provided by the electric fluid sensor.

2. The system of claim 1, comprising a feeder line, the feeder line further connecting the supply line to the DEF tank.

3. The system of claim 1, wherein the supply tank is positioned on a deck of a frame raised to a higher elevation than an inlet of the DEF tank.

4. The system of claim 1, wherein the supply tank is positioned on a trailer having a pump operable to supply DEF from the supply tank at a minimum pressure.

5. The system of claim 1, wherein the diesel engine provides power to a fluid pump.

6. The system of claim 1, wherein the DEF flow control device comprises a first light and second light, the first light configured to indicate an alarm and the second light configured to indicate operation of the electric fluid sensor.

7. The system of claim 1, wherein the DEF flow control device comprises a button configured to initiate operation of the electric fluid sensor.

8. The system of claim 1, wherein the valve comprises a motorized ball valve.

9. The system of claim 1, wherein the valve comprises a solenoid valve.

10. The system of claim 1, wherein the DEF flow control device comprises a threaded swivel connection configured to couple the DEF flow control device to the DEF tank.

11. The system of claim 1, wherein the DEF flow control device comprises a mandrel coupled to the electric fluid sensor, wherein the mandrel comprises a DEF fill port in fluid communication with the DEF tank and the valve outlet is in fluid communication with the DEF fill port.

12. A diesel exhaust fluid (DEF) flow control device, comprising:
    an enclosure containing control circuitry;
    a valve having an inlet and an outlet and moveable between an open position and a closed position, the open position configured to permit DEF flow through the valve and the closed position configured to block DEF flow through the valve;
    a valve actuator operable to move the valve between the open position and the closed position;
    an electric fluid sensor disposed in a sensor housing and comprising a shaft, the shaft comprising a slot such that the electric fluid sensor senses DEF when the slot is submerged; and
    a mandrel coupled to the electric fluid sensor and comprising a DEF fill port for providing fluid to a DEF tank, wherein the valve outlet is in fluid communication with the DEF fill port; and
    a battery configured to power the control circuitry, the valve actuator, and the electric fluid sensor,
    wherein the control circuitry comprises logic configured to move the valve between the open position and the closed position in response to a signal provided by the electric fluid sensor.

13. The DEF flow control device of claim 12, wherein the DEF flow control device comprises a threaded swivel connection configured to couple the DEF flow control device to the DEF tank.

14. The DEF flow control device of claim 12, comprising a pressure gauge configured to measure pressure at the inlet.

15. The DEF flow control device of claim 12, wherein the valve comprises a motorized ball valve.

16. A method of controlling diesel exhaust fluid (DEF) flow to a DEF tank for a diesel engine, comprising
    using a DEF flow control device coupled to the DEF tank, the DEF flow control device configured to stop the flow of DEF from a supply tank when the DEF flow control device detects fluid via an electric fluid sensor extending into the DEF tank, the DEF flow control device comprising:
an enclosure containing control circuitry;
a valve having an inlet and an outlet and moveable between an open position and a closed position, the open position configured to permit DEF flow through the valve and the closed position configured to block DEF flow through the valve, the outlet in fluid communication with the DEF tank;
a valve actuator operable to move the valve between the open position and the closed position;
the electric fluid sensor disposed in a sensor housing and comprising a shaft extending from the body into the DEF tank, the shaft comprising a slot such that the electric fluid sensor senses DEF when the slot is submerged; and
a battery configured to power the control circuitry, the valve actuator, and the electric fluid sensor.

17. The method of claim 16, wherein the DEF flow control device is in fluid communication with supply line of a gravity fed system.

18. The method of claim 16, wherein the diesel engine provides power to a fluid pump.

19. The method of claim 16, wherein the valve comprises a motorized ball valve.

20. A diesel exhaust fluid (DEF) flow control device, comprising:
an enclosure containing control circuitry;
a valve having an inlet and an outlet and moveable between an open position and a closed position, the open position configured to permit DEF flow through the valve and the closed position configured to block DEF flow through the valve outlet, the valve outlet in fluid communication with a DEF fill port;
a valve actuator operable to move the valve between the open position and the closed position;
means for sensing DEF in a DEF tank and generating a signal in response thereto; and
a mandrel comprising a DEF fill port for providing fluid to the DEF tank, wherein the valve outlet is in fluid communication with the DEF fill port,
wherein the control circuitry comprises logic configured to move the valve between the open position and the closed position in response to the signal.

\* \* \* \* \*